US008339953B2

(12) United States Patent
Kulessa et al.

(10) Patent No.: US 8,339,953 B2
(45) Date of Patent: Dec. 25, 2012

(54) APPARATUS AND METHOD FOR MONITORING DATA TRANSMITTER

(75) Inventors: Ralph Kulessa, Hilpoltstein/Hofstetten (DE); Frank Siebenhaar, Nürnberg (DE); Christian Neubauer, Nürnberg (DE)

(73) Assignee: MusicTrace GmbH, Erlangen (DE)

( * ) Notice: Subject to any disclaimer, the term of this patent is extended or adjusted under 35 U.S.C. 154(b) by 630 days.

(21) Appl. No.: 12/093,028

(22) PCT Filed: Nov. 9, 2006

(86) PCT No.: PCT/EP2006/010769

§ 371 (c)(1), (2), (4) Date: May 8, 2008

(87) PCT Pub. No.: WO2007/054320

PCT Pub. Date: May 18, 2007

(65) Prior Publication Data

US 2008/0267272 A1 Oct. 30, 2008

(30) Foreign Application Priority Data

Nov. 10, 2005 (DE) ......................... 10 2005 053 686

(51) Int. Cl.
*H04J 1/16* (2006.01)
*H04L 12/28* (2006.01)

(52) U.S. Cl. .... 370/231; 370/235; 370/241; 370/395.64

(58) Field of Classification Search .................. 370/241, 370/395; 455/436, 437, 438, 453, 442
See application file for complete search history.

(56) References Cited

U.S. PATENT DOCUMENTS

| | | | | |
|---|---|---|---|---|
| 5,970,396 | A * | 10/1999 | Takashima | 455/135 |
| 6,195,680 | B1 * | 2/2001 | Goldszmidt et al. | 709/203 |
| 6,529,479 | B1 * | 3/2003 | Suzuki | 370/236.1 |
| 6,622,159 | B1 * | 9/2003 | Chao et al. | 709/203 |
| 6,671,883 | B1 | 12/2003 | Rahman | |
| 6,697,370 | B1 * | 2/2004 | Doi et al. | 370/395.21 |
| 2002/0150102 | A1 | 10/2002 | Janko et al. | |
| 2003/0046032 | A1 | 3/2003 | Puthiyedath | |
| 2003/0236905 | A1 | 12/2003 | Choi et al. | |
| 2004/0055016 | A1 | 3/2004 | Anipindi et al. | |
| 2007/0143490 | A1 * | 6/2007 | Gallou et al. | 709/231 |
| 2007/0177558 | A1 * | 8/2007 | Ayachitula et al. | 370/338 |

FOREIGN PATENT DOCUMENTS

| | | | |
|---|---|---|---|
| DE | 195 11 087 | A1 | 10/1996 |
| WO | 2004/029756 | A2 | 4/2004 |

OTHER PUBLICATIONS

Official communication issued in the International Application No. PCT/EP2006/010769, mailed on Mar. 30, 2007.

* cited by examiner

*Primary Examiner* — Melanie Jagannathan
(74) *Attorney, Agent, or Firm* — Keating & Bennett, LLP

(57) ABSTRACT

For monitoring a data transmitter such as a streaming server, which supplies transmitted data in response to a request of a receiver, an examiner examines a data traffic at the input of a receiver or at the output of the receiver, the examiner being configured to ascertain whether the data traffic falls below a minimum threshold. If the minimum threshold is fallen below, a connection activator initiates a new connection between the receiver and the data transmitter. This serves to enable consistent data-transmitter monitoring, even for non-reliable point-to-point connections via the internet.

22 Claims, 6 Drawing Sheets

APPARATUS AND METHOD FOR MONITORING DATA TRANSMITTER

TECHNICAL FIELD

The present invention relates to transmitter monitoring and in particular to automatable implementations of transmitter monitoring.

BACKGROUND

There is a demand for being informed on the contents or properties of broadcasting programs. This demand for information may be satisfied technically by means of so-called broadcast monitoring services. For a recognition and analysis of broadcast contents, fingerprinting or watermark methods, for example, are utilized in the monitoring products. The sources, that is the broadcast contents, may be received in a variety of ways, such as terrestrially, per satellite, per cable or per internet. In general, demands on monitoring products are fastness, low complexity, reliability and fail safety.

Typically, point-to-point connections are established for the reception of broadcast programs offered via the internet (e.g. simulcasts, webcasts, etc.). Here, the data is transferred from the source (streaming server) to the sink (streaming client, e.g. on a consumer PC in a private household) per internet streaming. For the reception and playback of the broadcast program offered, software players (e.g. Winamp, Realplayer, Windows Media Player) are typically employed.

For short-time connections as necessitated by the end user, this usually works without problems. However, in order to operate a monitoring service, it is desired to be able to receive the program around clock and with as few interruptions as possible so as to be able to ascertain the monitoring data in a consistent manner. Here, the following problems may occur on the reception side:

The streaming server terminates the transmission of the data after a certain period.

The data is not transmitted on time due to "data congestion"—as a result of insufficient transmission capacities in the network.

The point-to-point connection is interrupted at certain intervals by internet providers (not the streaming server), such as during an IP change on DSLs.

An error in the reception/playback software occurs, which results in the discontinuation of the reception activities.

The result of all these problems typically is that software players receiving and reproducing the streaming offer will terminate and not resume their activities. Thus, in this case, the monitoring activities also cannot be continued.

One solution to the problem consists in human interaction as it would occur with the end user, for example, who whishes to listen to a broadcast program per internet for short periods of time only. That is, if the human listener perceives that a multimedia signal is no longer present at the output of the streaming client, they will start the program anew. The drawbacks of this method are:

Excessive delay in the resumption of the monitoring

Extremely high costs as a human worker needs to constantly monitor the condition of the reception.

DE 19511087 A1 describes a method of automatically switching on replacement connections via the ISDN network in the case of faulty dedicated or standard connections.

US 2002/0150102 A1 discloses a system of analyzing a streaming medium with respect to its quality.

WO 2004/029756 A2 discloses a user interface in a communications network, wherein a server is connected to the internet, and a wireless telephone network and a wireless LAN are connected to the internet.

SUMMARY

According to an embodiment, an apparatus for monitoring a data transmitter, from which transmitted data is achievable in response to a request of a receiver, may have: an examiner for examining a data traffic at an input of the receiver or at an output of the receiver, the examiner being configured to ascertain whether the data traffic falls below a minimum threshold; and a connection activator for initiating a new connection between the receiver and the data transmitter when the data traffic has fallen below the minimum threshold, wherein the receiver is a process running on a first computer, which is connected to a local network, wherein the examiner is configured to run on another second computer, which is also connected to the local network, monitor a plurality of further receivers associated with further data transmitters, and, in an initiation of a new connection, access the first computer, on which a faulty receiver is running, via the local network; and an internet interface, on the one hand connected to the first computer and the second computer via the local network and on the other hand connectable to the internet.

According to another embodiment, a method of monitoring a data transmitter, from which transmitted data is achievable in response to a request of a receiver, wherein a first computer and a second computer are connected to a local network, which on the one hand is connected to an internet interface, which on the other hand is connected to the internet, may have the steps of: examining a data traffic at an input of the receiver or at an output of the receiver, wherein the examiner is configured to ascertain whether the data traffic falls below a minimum threshold; and initiating a new connection between the receiver and the data transmitter when the data traffic has fallen below the minimum threshold, wherein the receiver is a process running on the first computer, which is connected to the local network, wherein the examining is effected on the other second computer, which is also connected to the local network, wherein, in the examining, a plurality of further receivers associated with further data transmitters are monitored, and wherein, in the initiating, in initiating a new connection, the first computer, on which a faulty receiver is running, is accessed via the local network.

An embodiment may have: a computer program with a program code for performing a method of monitoring a data transmitter, from which transmitted data is achievable in response to a request of a receiver, wherein a first computer and a second computer are connected to a local network, which on the one hand is connected to an internet interface, which on the other hand is connected to the internet, wherein the method may have the steps of: examining a data traffic at an input of the receiver or at an output of the receiver, wherein the examiner is configured to ascertain whether the data traffic falls below a minimum threshold; and initiating a new connection between the receiver and the data transmitter when the data traffic has fallen below the minimum threshold, wherein the receiver is a process running on the first computer, which is connected to the local network, wherein the examining is effected on the other second computer, which is also connected to the local network, wherein, in the examining, a plurality of further receivers associated with further data transmitters are monitored, and wherein, in the initiating, in initiating a new connection, the first computer, on which a faulty receiver is running, is accessed via the local network, when the program runs on a computer.

An embodiment may have: monitoring result data having been produced using a method of monitoring a data transmitter, from which transmitted data is achievable in response to a request of a receiver, wherein a first computer and a second computer are connected to a local network, which on the one hand is connected to an internet interface, which on the other hand is connected to the internet, wherein the method may have the steps of: examining a data traffic at an input of the receiver or at an output of the receiver, wherein the examiner is configured to ascertain whether the data traffic falls below a minimum threshold; and initiating a new connection between the receiver and the data transmitter when the data traffic has fallen below the minimum threshold, wherein the receiver is a process running on the first computer, which is connected to the local network, wherein the examining is effected on the other second computer, which is also connected to the local network, wherein, in the examining, a plurality of further receivers associated with further data transmitters are monitored, and wherein, in the initiating, in initiating a new connection, the first computer, on which a faulty receiver is running, is accessed via the local network.

An embodiment may have: a machine-readable carrier having stored thereon monitoring result data having been produced using a method of monitoring a data transmitter, from which transmitted data is achievable in response to a request of a receiver, wherein a first computer and a second computer are connected to a local network, which on the one hand is connected to an internet interface, which on the other hand is connected to the internet, wherein the method may have the steps of: examining a data traffic at an input of the receiver or at an output of the receiver, wherein the examiner is configured to ascertain whether the data traffic falls below a minimum threshold; and initiating a new connection between the receiver and the data transmitter when the data traffic has fallen below the minimum threshold, wherein the receiver is a process running on the first computer, which is connected to the local network, wherein the examining is effected on the other second computer, which is also connected to the local network, wherein, in the examining, a plurality of further receivers associated with further data transmitters are monitored, and wherein, in the initiating, in initiating a new connection, the first computer, on which a faulty receiver is running, is accessed via the local network.

The present invention is based on the finding that broadcast monitoring or, more generally put, the monitoring of data transmitters, may be effected in a very efficient and cost-effectively implementable manner when data from data transmitters is monitored via a connection, which is activated in response to a request of a receiver. At present, all current broadcasting stations also maintain an internet radio service that is a radio service via a connection that is activated only upon enquiry of a receiver. In the case of such a "point-to-point" connection, a user will not receive data until they have issued a request, that is, in a sense, a "download request", to the transmitter. In response thereto, the transmitter transmits data packets to the receiver who has issued the request to the transmitter.

This serves the opportunity of achieving broadcast monitoring, that is data-transmitter monitoring, which is independent of the direct reception of a broadcast program and therefore does not have to deal with all the problems along with direct broadcast reception. As a result, stations or transmitters are available over the internet at locations at which they may not be available over normal broadcast receivers.

According to the invention, this receiver-activated connection is, however, monitored as it is vulnerable to interferences, which, particularly in the case of transmitter monitoring, would challenge the entire monitoring task.

According to the invention, for monitoring a connection, data traffic at the input of a receiver or data traffic at the output of the receiver is monitored. Should the data traffic fall below a minimum threshold, the old connection—as far as it still exits—is advantageously terminated and a new connection between the receiver and the data transmitter is initiated, wherein this initiation is advantageously effected automatically as this necessitates no operating personnel.

As the inventive concept is applicable for internet connections, that is receiver-initiated download or streaming connections, the tasks of examining the data traffic and the connection initiation may also be cost-effectively implemented on conventional computers, whose only task it is to prompt the data receiver, for initiating a connection, to issue a request for connection to the transmitter or directly establish a connection at the data transmitter in favor of the data receiver.

In an embodiment of the present invention, the receiver and the monitoring means are installed as separate programs or even on separate computers, which particularly enables the monitoring of a multitude of stations or transmitters simultaneously using one single monitoring means for the multitude of stations or transmitters.

In a further embodiment, the data receiver is configured to output a signal dependent on data traffic at the input or data traffic at the output, which may be received and interpreted by the inventive examination means. For reasons of complexity and computer resources, this signal is only an "alive" signal, which includes, at certain regular intervals, which are advantageously known to the examination means of the monitoring means, a pulse, which indicates that either the connection between the transmitter and the receiver, that is data traffic at the input, is still functioning, or that data is output at the output of the receiver, that is, that neither the connection nor the data receiver as such are faulty.

In a further embodiment of the present invention, the monitoring of the traffic at the input of the receiver is effected for a certain amount of time so as to also gain a consistent monitoring of the functionality of the data receiver as such. This takes place at least until an input buffer typically present at the input of the receiver is filled either completely or up to a certain degree, which the receiver necessitates for consistent data processing such as audio and/or video decoding. In this amount of time, in which the receiver solely fills its input buffer without supplying any output data, the data traffic at the output of the receiver is not monitored in this embodiment as even during regular operation, output data has at this moment not yet been delivered. When the receiver begins outputting data, that is, when, in the case that the receiver is configured as a decoder, decoded data leaves the receiver, the monitoring of the data traffic at the input is discontinued. When the data traffic at the output falls below a minimum threshold, a connection is activated. This serves to not only monitor the connection between the receiver and the server but at the same time also the receiver as such. It may thus happen that the receiver, when it is a decoder, "crashes" on receiving a damaged packet, for example, or has a software error that occurs only sporadically, for example.

In a further embodiment, the connection at the data input is simultaneously also monitored in order to activate a new connection directly after detecting that a connection has discontinued. If the input buffer of the receiver is large enough, this connection discontinuation will not result in a discontinuation of the data output as the input buffer of the decoder is still being processed at the time the new connection is activated. However, those data packets that were transmitted from the broadcasting station between the discontinuation of the connection and the reestablishment of the connection are lost. This is, however, not very problematic as this amount of time is only very small.

The present invention is particularly advantageous in that what is enabled is automatic monitoring of data transmitters, which supply data via point-to-point connections, that is send transmitted data to a receiver in response to a request of this receiver.

As, according to the invention, the data traffic at the input of the receiver and/or at the output of the receiver is monitored, it is reliably ensured that every time the point-to-point connection is interrupted, a new connection will be initiated. As a result, the only data of the transmitter that is lost is the data that the transmitter would supply in the amount of time between the discontinuation of the connection and the reestablishment of the connection. Thus, the present invention is reliable as this amount of time is kept short.

The present concept is further cost-effectively realizable as the necessitated routines may be implemented in a computer-aided manner without necessitating any human interaction. Therefore, a fully automatable monitoring concept is provided, which may be implemented by means of conventional available computers, which only necessitates conventional receivers such as streaming players or audio and/or video decoders, for example, and which is further easily “upgradable” to an arbitrary amount of stations or transmitters. In contrast to the broadcast monitoring of the broadcast signal broadcast via a transmitting antenna, wherein a multitude of receivers are accommodated in a multitude of distributed locations as each transmitter only disposes of a certain range, the present invention is not locally bound as it is based on the point-to-point connection as it is typically present in the internet. As a result, a country may even monitor the broadcasting stations of another country when an internet interface is present and an internet receiver is employed, which receives download data packets from a transmitter located anywhere.

The number of the monitored stations or transmitters is limited only by the resources necessitated by the receiver. If, for example, a number of software receivers, wherein each broadcasting station is provided with its own audio and/or video player as a receiver, and the associated evaluation software for examining and evaluating the program output by the receiver exceeds the resources of a computer, this will not cause any problems as a standard local network in which several computers may be interconnected is easily implementable. A local network is especially advantageous in that the monitoring means are also provided on a separate computer, which is separate from the usually multiple computers, which comprise the data receivers and at the same time comprise the reception-data evaluation programs, so that, in the case that a receiver crashes, thereby possibly even making a computer having further receivers running thereon crash, there will be no impairment of the monitoring means for other receivers contained in the local network.

The inventive monitoring result data is produced or created by means of a method of monitoring the reception of data from a data transmitter, which comprises the steps of receiving data from the data transmitter, in response to a request for data to the data transmitter, of the decoding of data received from the data transmitter, of outputting decoded data, of examining a data traffic at the reception of data or at the output of decoded data, of outputting a signal dependent on the data traffic, and of the evaluating of the decoded data so as to obtain monitoring result data. The outputting or the non-outputting of the signal dependent on the data traffic effects a new connection between the transmitter and the receiver so that the monitoring result data represents a virtually consistent transmitter monitoring, which cannot be achieved from transmitters monitored manually or per broadcast transmission. In other words, the data the monitoring result data is derived from by means of an evaluation are more inconsistent than with the present invention. The monitoring result data is advantageously stored on a machine-readable carrier to be capable of being efficiently reprocessed.

BRIEF DESCRIPTION OF THE DRAWINGS

Embodiments of the present invention will be detailed subsequently referring to the appended drawings, in which.

DETAILED DESCRIPTION

Figure 1:
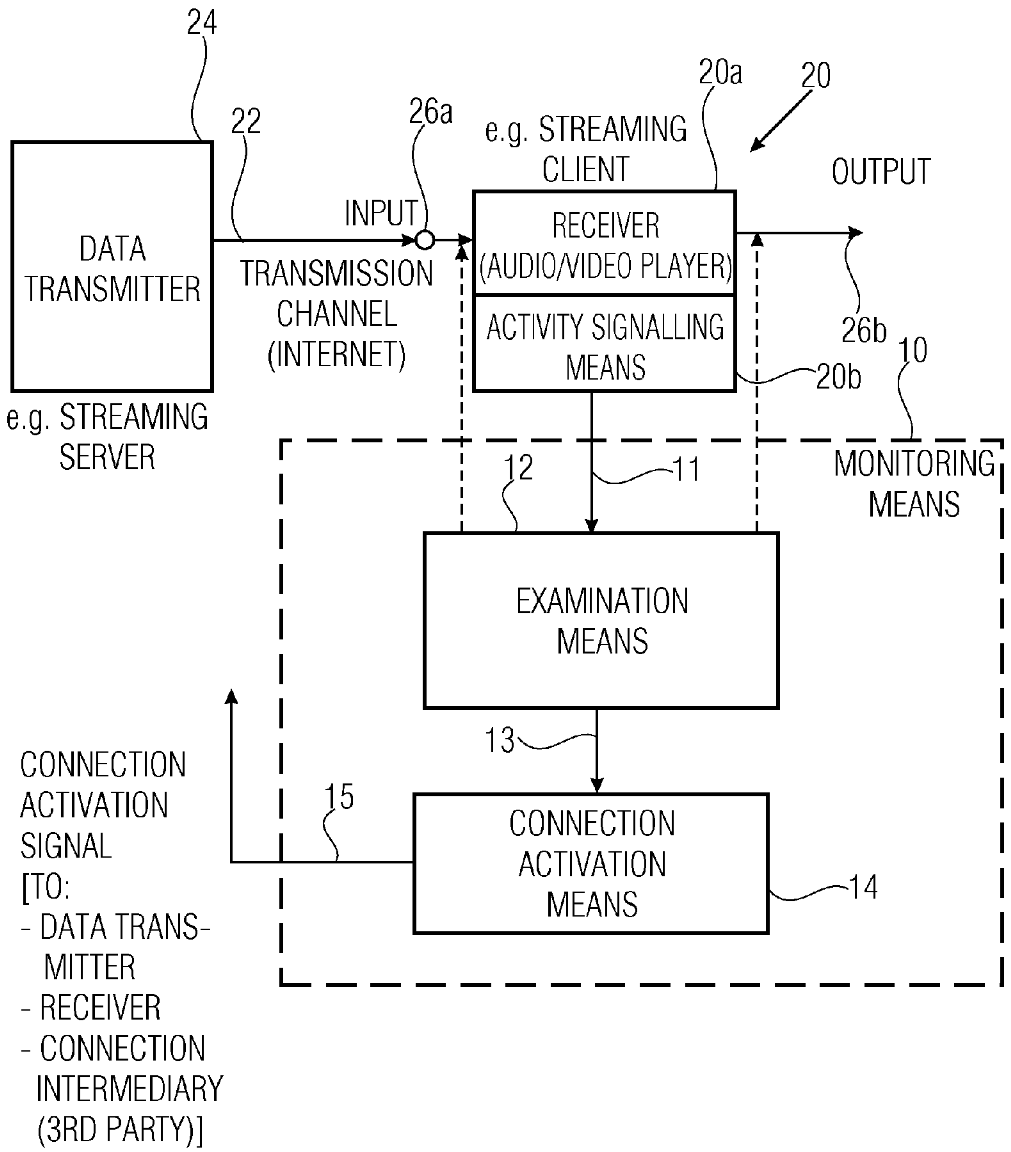
FIG. 1 shows a block diagram of an inventive data receiver cooperating with inventive monitoring means.

FIG. 1 shows inventive monitoring means 10 cooperating with a reception block 20, which typically comprises a receiver in the form of an audio and/or video player 20*a* and an inventive activity signaling means 20*b*. The receiver is connected to a data transmitter 24 via a transmission channel 22. Advantageously, the data transmitter is configured as a streaming server, while the reception block 20 is configured as a streaming client. The receiver comprises a receiver input 26*a* and a receiver output 26*b*, wherein the data received at the receiver input 26*a* is data supplied by the data transmitter on request of the reception block 20, the data in the case of an internet transmission, being data packets such as supplied via a progressive download in compliance with the http protocol.

Alternative protocols for the transmission channel are also known as shoutcast and/or icecast, which are also known as a proprietary ICY protocol. In compliance with the http protocol, there are several http requests, of which the request “options” is a poll of the features supported by the server. “Get” represents fetching a uniform resource identifier (URI) such as URL (http:// . . . ) or URN (/ .html) (e.g. a file) from a server. The request “head” serves for fetching the response header of a URI. The request “post” serves for transmitting data to the server. The request “put” supplies an upload after a URI. The request “delete” resolves in deleting a URI. The request “trace” represents a debug option, wherein a server renders a request. The request “connect” represents a connection to the proxy server.

In compliance with http, requests for data may come from a client only. The client with the fastest interworking and processing speed gains the best throughput. In http, the data is transmitted as fast as possible and saved to disc by the client, no traffic shaping is performed. In principle, each file should first be completed at the client before playback. In “http progressive download", entire files are downloaded from the server, the playback procedure, however, beginning as soon as sufficient data is available. The advantages are that web-servers may be employed for content distribution. In addition, known players support this feature. Downloaded data may further be repeatedly reproduced. One drawback, which is, however, not causing any problems with the present invention, is that there is no back channel and bit rate information except in the file itself.

Alternative download protocols are the 3GPP progressive download or shoutcast, for example, wherein a broadcast transmission of typically MP3-encoded files takes place in a manner similar to http. This protocol is modeled on http, which is why the present infrastructure, and in particular the (proxy) servers may be utilized. This protocol has proved successful for the transmission of MP3, AAC, etc. Furthermore, it disposes of good scalability. There is a simple (open-source) implementation.

The monitoring means 10 in FIG. 1 serve for monitoring the data transmitter 24, from which transmitted data is obtainable via the transmission channel 22 in response to a request of the receiver 20. The monitoring means 10 comprise examination means 12 for examining a data traffic at the input 26*a* of the reception block 20 or at an output 26*b* of the reception block 20, the examination means 12 being configured to detect whether the data traffic falls below a minimum threshold. The monitoring means further comprise connection activation means 14 for the advantageously automatic initiation of a new connection between the receiver 20 and the data transmitter 24 when the data traffic has fallen below the minimum threshold as is notified to the connection activation means 14 by the examination means 12 via a signaling line 13. The connection activation means 14 therefore supplies a connection activation signal 15 in the case of a necessitated initiation of a new connection. This connection activation signal may be transmitted directly to the data transmitter 24 in dependence on the specific implementation. In that case, the connection activation means would sent a request for data indicating the receiver and/or the URI of the receiver 20*a* so that the data transmitter resumes sending data to the receiver. Alternatively, the connection activation means 14 may also send its output signal 15 to the receiver 20 so that the receiver itself will send a respective request for data to the data transmitter 24. Alternatively, the connection activation means 15 could also send the connection activation signal to a third party, that is to a connection intermediary, which could be located in a local network on the receiver side, for example, so as to unburden the receiver, and which could be centrally organized in order to reestablish a connection from the data transmitter to the receiver when this connection was previously discontinued.

Figure 2:
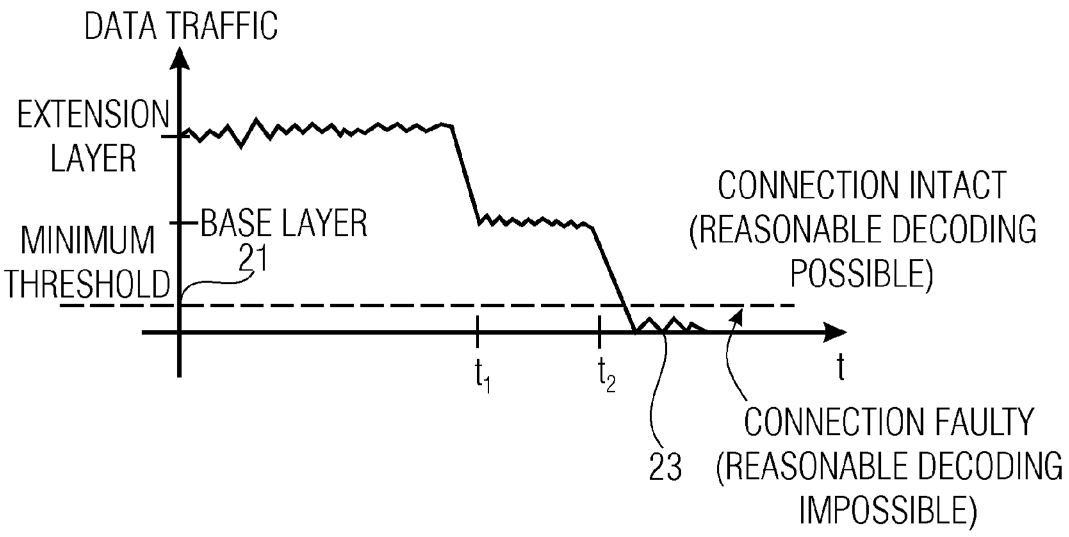
FIG. 2 shows a schematic representation of a typically present course of the data traffic versus time with a minimum threshold.

FIG. 2 shows a possible situation of the data traffic versus time at the input or at the output of the receiver. At a certain point in time before a time $t_1$, for example, a relatively high data traffic could be present as, e.g., a data transmitter has "passed through" over the network both the base layer and the extension layer. At time $t_1$, the network parameters had changed, for example. Thus, the traffic over the network has possibly increased so much that the data transmitter was no longer able to send both the base layer and the extension layer in a scalable scenario but was only able to send the base layer alone. However, the reception of the base layer only also enables decoding a program and therefore monitoring the program for monitoring purposes. At a time $t_2$, however, the data traffic has decreased, for example due to a data congestion in the network or due to the receiver crashing, so much that it is below the minimum threshold 21. According to the invention, the minimum threshold is not set to equal to zero data packets but to slightly above zero data packets in a certain amount of time so that the arrival of very few packets, as it is shown at 23 in FIG. 2, will not feign a functioning connection. Similarly, a receiver such as an audio and/or video player, for example, might still output data after having crashed, the data, however, already being erroneous, that is only fragmentarily representing something that may no longer be properly monitored. In order for a new connection getting started again in this case, the minimum threshold is set such that it represents a traffic value less than a traffic value with which reasonable decoding and/or reasonable evaluation of the decoded signal is still just possible but still larger than a possibly occurring traffic value still being present at the input or at the output in spite of the severely faulty connection and in spite of the already erroneous functionality of the receiver software.

It is to be noted that the examination means 12 does not necessarily have to ascertain a traffic value and compare this traffic value to the threshold in order to become active if the minimum threshold is fallen below. It is instead advantageous that the examination means for monitoring the input-side or output-side traffic obtain and evaluate signals of the activity signaling means 20*b*. The activity signaling means is typically integrated into the reception block 20, that is located at the receiver, while the monitoring means 10 are advantageously located separate from the receiver, that is on another machine/computer in a local network, for example, as is demonstrated still referring to FIG. 7.

The activity signaling means 20*b* is configured to supply, each time a data traffic at the input or at the output is sufficient, a (pulse) signal allowing a receiver of the signal to conclude that the connection via the transmission channel 22 is present or that the receiver supplies at its output reasonably decoded data. This pulse signal, which is also referred to as an "alive packet", contains, in the case of an implementation in which a multitude of receivers are present as a multitude of transmitters are to be monitored, identification of the specific receiver at the same time. The examination means 12 is configured to receive and evaluate these alive packets from the various receivers, of which only one is indicated in FIG. 1. Thus, in this case, the examination means 12 will read the identification of a receiver, which is contained in the alive packet, and therefore detect the receiver having sent the alive packet as functional.

If, however, the examination means 12 does not receive an alive packet for a certain receiver for which previously an alive packet has been received, after a predetermined amount of time, which may for example be 10 s, but could generally range from 1 s to 50 s, then a conclusion is made therefrom that the data traffic at the input of the receiver and/or the data traffic at the output of the receiver has fallen below the minimum threshold. In this embodiment, the examination means is configured to verify whether a further alive packet arrives from a certain receiver after a predetermined amount of time. This verification whether a further alive packet from a receiver arrives after a certain amount of time therefore represents the examination of the data traffic at the input of the receiver or at the output of the receiver, wherein the examination means is configured to ascertain that the data traffic falls below a minimum threshold when there are no more alive packets arriving from a receiver after a predetermined amount of time.

Alternatively, the examination means of FIG. 1 may also be "merged" with the activity signaling means 20*b* to the effect that the examination means is located in the receiver 20*a* itself and that, when no alive packet is transmitted during a predetermined amount of time, the connection activation means is immediately activated in order to supply the connection activation signal 15.

In an alternative embodiment, the examination means may also be configured to measure the data traffic directly at the input and/or at the output, that is count the number of the data packets per amount of time on the input side, for example, and then compare the count to a minimum threshold in order to ascertain whether a correct connection is still present. At the output side, the examination means could also be configured to quantify the data traffic directly at the output and compare same to a minimum threshold.

According to the invention, it is advantageous, however, that part of this monitoring is performed by means of the activity signaling means located in the receiver, while the examination means is configured separately from the receiver in the monitoring means 10. This implementation is particularly well-suited for the LAN embodiment as it will be described later on in the context of FIG. 7.

In the following, an implementation of the functionality of the cooperation of the receiver and the inventive monitoring means is presented by means of FIG. 3. In a step 30, a connection between the receiver and the data transmitter is initialized upon request of the receiver either at the very first time or after a discontinuation of the connection or at a restart of the entire system as a whole. Thereupon, the data traffic at the input is monitored (32) either by means of examination means disposed in the receiver alone or by means of activity signaling means 20*b* in combination with the examination means 12 in FIG. 1. In a block 34, a verification is made whether a predetermined period of time has already expired or whether a certain amount of data has already been received. If this is not the case, the question is answered with no in block 34, and the data traffic at the input is continued to be monitored. Then, when a predetermined time has expired or a certain amount of data has already been received, the monitoring of the data traffic at the output is commenced, as is represented at step 36.

During the predetermined time given in block 34, the input buffer of the receiver is filled, while the receiver does not yet output any decoded data. Then, when the predetermined time has expired, the input buffer of the receiver is sufficiently filled and the receiver commences outputting data.

This is to ensure that the system does not enter an infinite loop as naturally, directly after initializing a connection, there will not yet be any decoded output data as the decoder will start supplying output data, or having a noteworthy output-data traffic, only as of a certain input-buffer level or after a certain delay.

Figure 4:
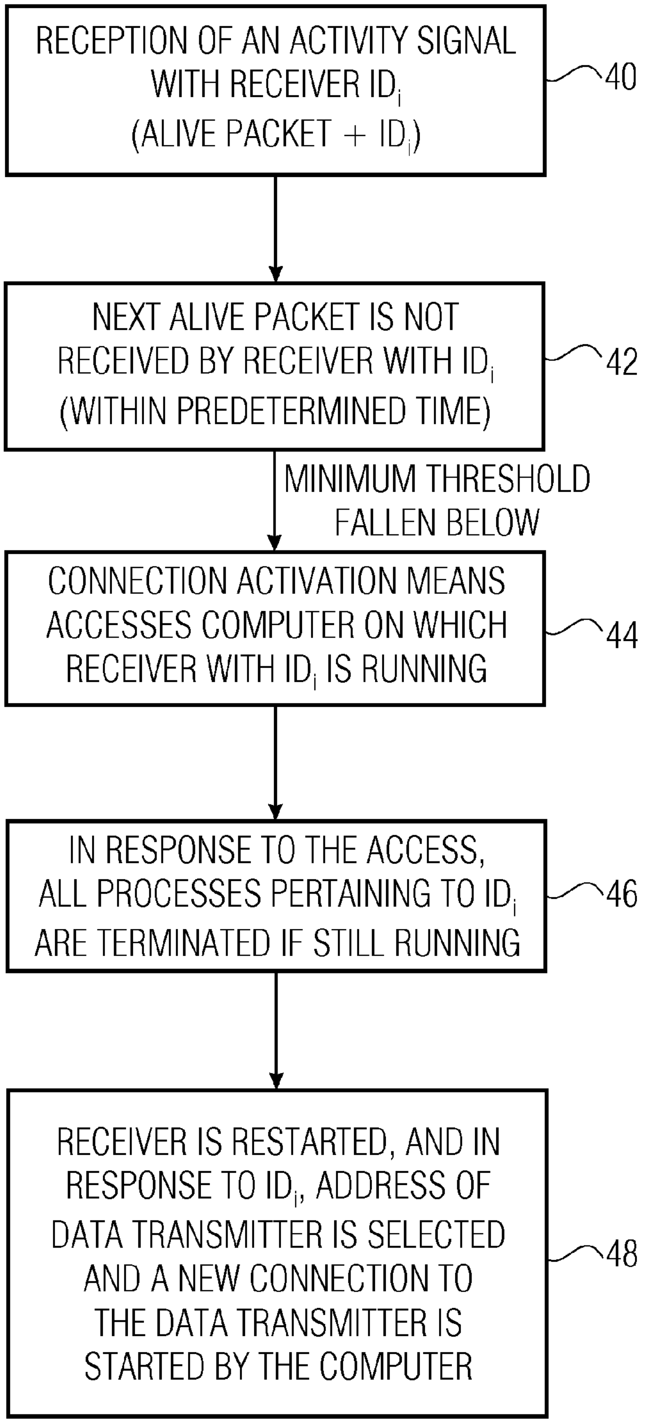
FIG. 4 shows a further block diagram of the functionality of the connection activating means in combination with the examination means.

FIG. 4 shows an implementation of the examination means 12 of FIG. 1. First, an activity signal is received by the activity signaling means 20*b* via the activity signal line 11 as depicted at 40 in FIG. 4. The activity signal is an alive packet having identification of the receiver, that is an IDi, wherein i stands for the receiver having the number i. The examination means 12 is configured to examine in a step 42, whether a next alive packet is received by the receiver with the identification IDi within a predetermined period of time. If such a next alive packet is not received, the examination means 12 will conclude that the minimum threshold is fallen below. In response thereto, the connection activating means accesses the computer on which the receiver with IDi is running (44). In response to the access, all processes associated with IDi and possibly still running are terminated (46) in the embodiment of the present invention. Therewith, the invention ensures that there will not remain any processes on the computer pertaining to a receiver that is no longer able to receive. This serves to ensure that whenever a connection is discontinued or when the receiver having the number i is no longer able to receive, everything originating from this receiver, that is all related processes, are properly terminated on the computer on which the receiver is running. After that, the receiver having the identification IDi is restarted on the computer on which it is supposed to be running and/or on a computer on which resources are currently available. In response thereto, the address of the data transmitter that is associated with the ID is selected and a new connection to the data transmitter is started by means of the computer.

As has been explained, several data transmitters are monitored according to the invention. This means that at least one receiver is active for each data transmitter. When a connection was discontinued or when a receiver has "crashed", so as to start a new connection with exactly this data transmitter, in step 48, in response to the identification IDi of the crashed receiver, the data transmitter associated with this receiver is selected from a plurality of various data transmitters so as to reestablish a connection to the same data transmitter.

Figure 5:
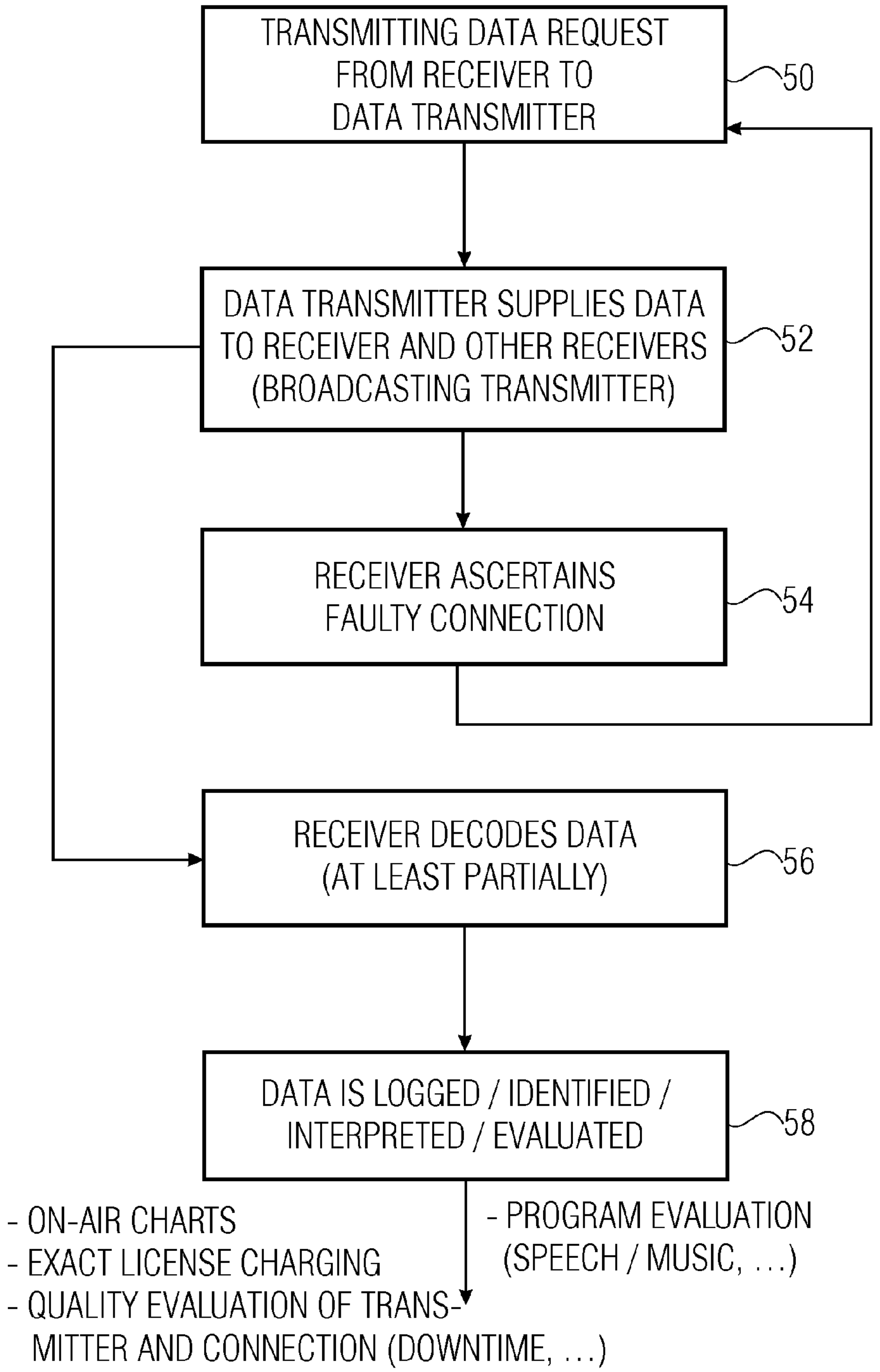
FIG. 5 shows a further block diagram of the functionality of the monitoring means in combination with the subsequent monitoring means.

FIG. 5 shows an inventive block diagram for the cooperation of the receiver, the data-monitoring means and the subsequent logging. First, the receiver sends a data request to the data transmitter as represented at 50. In response thereto, the data transmitter supplies this receiver with data, wherein naturally the data transmitter, being a broadcasting transmitter, also supplies other receivers having "logged onto" this data transmitter, that is having requested a stream of the radio internet program, with data. If the receiver and/or the monitoring means detect (54) a faulty connection or any other malfunction, a return will be made to step 50 so that a new data request is started.

While the data transmitter supplies data to the receiver and the connection is intact, the receiver decodes the data (at least partially) as represented in step 56. The result of the data decoding is an audio program and/or a video program or any other data representation to be monitored, which is then logged, identified, interpreted or generally evaluated by means of a specific desired program in a step 58. Therefore, the actual broadcast monitoring takes place in step 58 by any one of a certain number of techniques such as by audio identification by means of a fingerprint, by means of associated meta data, by means of a matching method or any other analysis methods for analyzing audio and/or video content. The data evaluation in step 58 may be used for supplying on-air charts, for example, in order to ensure exact license charging, in order to establish a quality evaluation of transmitter and connection, with respect to the downtime or other parameters, or in order to perform a relative rough program evaluation. Herein, it is ascertained, for example, how high the proportion of speech or music is in a radio program, how high the proportion of a broadcasting station, in which a program is broadcast in one language (such as German) and in which a program is broadcast in another language such as French or English, for example, is in terms of broadcast minutes etc. Arbitrary evaluations may now be effected as the inventive monitoring concept supplies virtually consistent monitoring across connection-oriented systems. Since all eventually desired results, which are illustrated as an output of block 58 in FIG. 5, are relatively rough characterizations, slight program losses, which will of course occur when a connection is discontinued, is ascertained as such and is restarted, are not critical as the short-time program losses will affect the overall result only minimally if at all.

Figure 6:
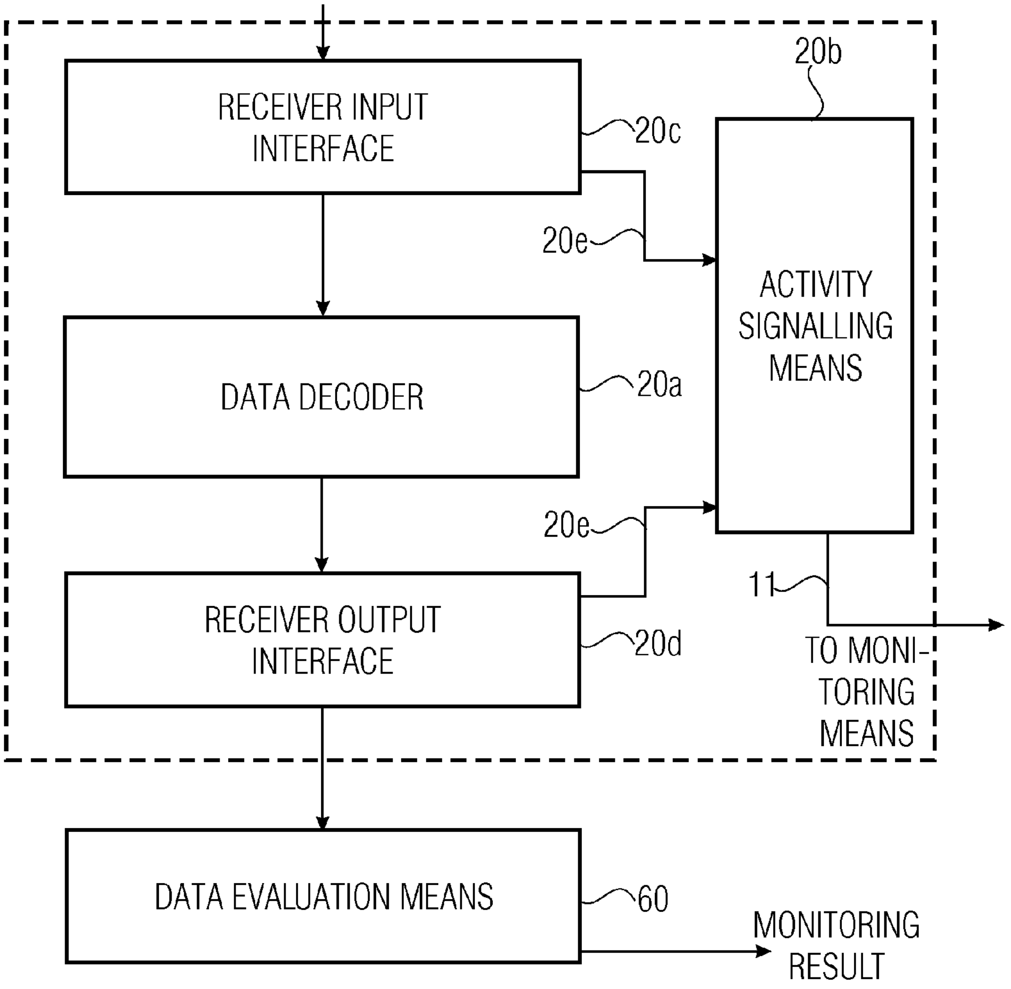
FIG. 6 shows an inventive implementation of the receiver.

FIG. 6 shows an inventive receiver implementation, which, as is represented in FIG. 1, comprises the one activity signaling means 20*b*. In addition to the actual core of the receiver, that is the data decoder 20*a*, a receiver input interface 20*c* and a receiver output interface 20*d* are also illustrated, which are connected to the activity signaling means 20*b* via monitoring lines 20*e* so that same may monitor the input-side and output-side traffic in order to send the alive packets, with the data decoder being functional, with an identification of the receiver 20 via the line 11, e.g. at regular intervals. Furthermore, what is represented in FIG. 6 is that data evaluation means 60, which is executing the functionality of step 58 of FIG. 5, is connected with the receiver output interface 20*d*, the receiver output interface being an output routine of an audio and/or video player, for example. The data evaluation means 60 then supplies one of the monitoring results as represented at the output of block 58 of FIG. 5.

Figure 7:
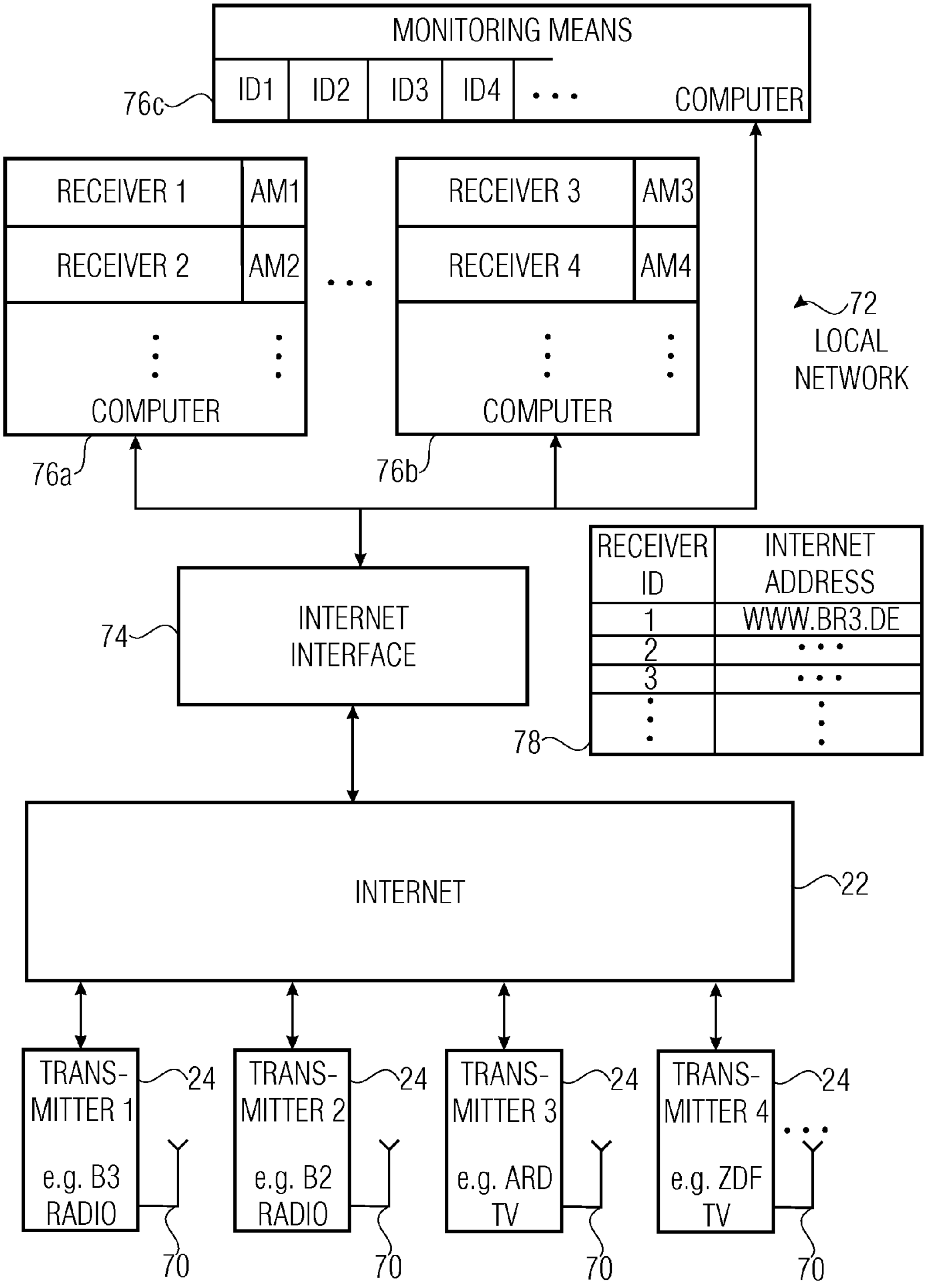
FIG. 7 shows a schematic representation of the total set-up with a local network on the monitoring side and several transmitters supplying their data on request via the internet.

FIG. 7 shows an inventive overall setup of an implementation on the receiver side, which is constructed in the form of a local network. As an example, a number of four transmitters 24 are shown, which are connected to the internet 22 so as to also provide, in addition to an open-air or cable interface, which is represented by an antenna symbol 70, their transmitted data via the internet.

On the receiver side, a local network 72 comprises an internet interface 74, which advantageously is a DSL or glass-fiber interface because of the high data-transmission rates when a multitude of transmitters are to be monitored in parallel.

The internet interface 74 is connected to various computers 76*a*, 76*b*, 76*c* via the local network 72, wherein on both computers 76*a* and 76*b* several receivers for several transmitters are running, and wherein the computer 76*c* is reserved solely for the monitoring means in the implementation shown in FIG. 7. Furthermore, each receiver has associated therewith its own activity signaling means (AM 1, AM 2, AM 3, AM 4, . . . ). In addition, the monitoring means 76*c* dispose, for each receiver, of a separate monitoring channel, identified with ID1 for receiver 1, ID2 for receiver 2, ID3 for receiver 3 and ID4 for receiver 4. Furthermore there is present, at any location in the local network, namely in a computer or in the internet interface, for example, an allocation table 78, by means of which a receiver ID is allocated to an internet address of a transmitter. The receiver having the identification number 1 is therefore allocated to the monitoring of the radio station Bayern3. Therefore, the receiver ID of transmitter 1 has associated therewith the internet address of this radio station. Based on the allocation table 78, the monitoring means may then in any way initiate a new connection—to the correct sender and with the correct internet address—by means of the connection activation means associated therewith, for example when the receiver 1 has crashed or the connection was discontinued on behalf of the transmitter.

Figure 3:
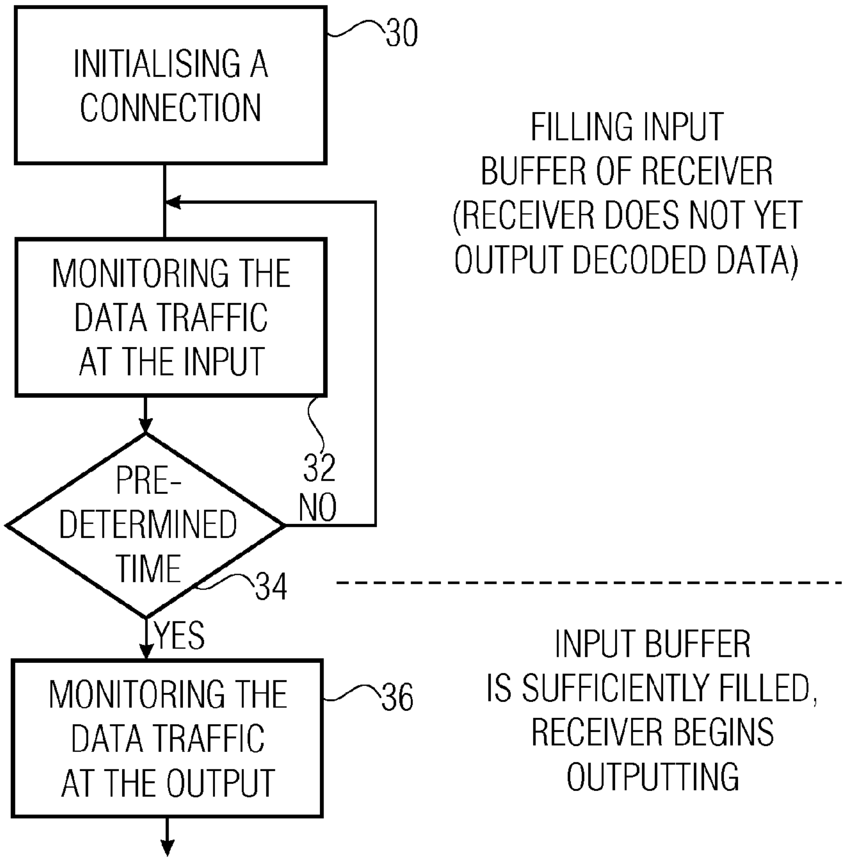
FIG. 3 shows a block diagram of an inventive implementation of the examination means.

As has been illustrated with respect to FIG. 3, the monitoring of the traffic at the receiver output will take place after the predetermined period of time. If the monitoring at the receiver input is performed in parallel, then, despite an interval of 10 seconds, for example, a new connection may be initiated as early as when a discontinuation of the connection to the data transmitter on the input side is detected, without the examination means having to wait for 10 seconds. In an embodiment of the present invention, this is achieved in that the activity signaling means also transmits a connection discontinuation signal in addition to an alive packet. If the examination means 12 ascertains that it has received a connection discontinuation signal (and no alive packet), the examination means evaluates the identification associated with the discontinuation signal so as to ascertain the minimum threshold having fallen below immediately, that is without waiting for the presence of a new alive packet (which may never arrive). In response thereto, the connection activation means will immediately initiate the steps represented by means of FIG. 4 in the blocks 44 to 48 so as to initiate a new connection.

There are monitoring means 10. The (software) player (streaming client) for the reception and/or rendition of the broadcast program offered includes (or communicates with) an apparatus transmitting signals (such as operating-system signals, data packets, entries in files) to the monitoring means 10 via a transmission channel at certain time intervals. The signals are transmitted, for example, when streaming packets are received from the network and/or when the demultiplexed and possibly decoded signals are rendered. Means 10 registers these signals and memorizes at which time means 22*b* answered to means 10 for the last time.

As long as no problems occur, means 10 registers the signals regularly and may log this, for example for documenting the downtimes of the monitoring activity or of the transmitters.

In the problem case, means 20*b* no longer transmits any signals to means 10, for example because no more data packets are received or no more broadcast contents such as audio and/or video signals may be rendered for lack of data packets. When means 10, after a certain amount of time, no longer receives any signals from means 20*b* or when means 10 ascertains that the connection to means 20*b* has broken down, means 10 will react. The processes of the software player (streaming client) in question, as far as same or parts thereof still exist, are terminated and the software player is automatically restarted. Here, the software player sets up a new point-to-point connection to the streaming server, and the broadcast contents may again be received virtually uninterruptedly and therefore be monitored.

The same effect may be achieved when means 20*b* is not a constituent part of the software player but when the network connection of the software player and/or the output of audio/video data of the software player is still monitored by means 20*b*. Likewise, means 20*b* may also be a constituent part of means 10, wherein then the interval of the temporal verification may become arbitrarily small.

The inventive concept has the following advantages:

With skilled realization, the starting of the streaming client may be effected remotely on any computers in the network.

The reconnect may be effected very fast (within seconds) and at any points in time.

The monitoring operation is effected virtually uninterruptibly.

The resumption of the monitoring operation is reliable as being automated.

The restarting may also be effected repeatedly, for example if no connection to the internet may be established (for example when the internet provider discontinues the connection), for as long as until the connection has successfully then reestablished.

No human interaction necessitated (important for example at night).

The system scales even if the number of transmitters is very high.

The present invention therefore concerns a method and an apparatus having monitoring means 10 and one or more monitored means 20*b*, which in turn themselves ensure activity of the means 20. Depending on the implementation, means 10 and/or means 20*b* and/or means 20*a* are software programs. Means 10 and means 20*b* may communicate via a network, via files, via signals or any other communications channels. Furthermore, means 10 may monitor several means 20*b* and therefore also several means 20*a* simultaneously. Means 10 and/or means 20*b* and/or means 20*a* may run on the same or on different computers. Furthermore, means 20*a* and 20*b* may be integrated in one program so that therefore means 20*b* is a part of means 20*a*. Alternatively, means 20*a* and 20*b* may also be stand-alone programs. In addition, means 20*b* may also be a part of means 20*a*. It is furthermore advantageous that means 20*a* perform a reception process producing an audio and/or video signal and advantageously perform an internet streaming process. The transmitting of the “alive” messages from means 20*b* to means 10 is advantageously “based on” the output signal of means 20*a* such that then, when means 20*a* no longer produces an audio and/or video signal, no more messages are sent from means 20*b*. Alternatively or in addition, the transmitting of the “alive” messages from means 20*b* to means 10 is based on the reception of network packets. That is, if no more packets are received, no more alive messages will be sent.

Advantageously, alive messages contain additional information on the state of means 20*b* and/or means 20*a*.

Advantageously, means 10 is further able to restart means 20*b* and 20*a* if no alive messages have been sent over a certain period of time. It is furthermore advantageous that such a restart be effected repeatedly if preceding starting attempts have not been successful. Furthermore, means 10 is able to start means 20*a* and 20*b* if same have not yet started.

Means 10 is further able to start means 20*b* and/or 20*c* if means 10 ascertains that the communications channel between means 20*a* and means 20*b* is faulty, even when a predetermined period of time has not yet expired.

Furthermore, it is advantageous that means 10 transmit a message to operating personal when a restart for a receiver has been effected. Furthermore, means 10 may schedule programs of means 20*a* and 20*b*. It is further advantageous that means 10 may indicate the current status of means 20*a* and 20*b*. It is further advantageous that means 10 may monitor a multitude of means 20*b* and a multitude of means 20*a* together. Finally, it is also advantageous that means 10 restart means 20*a* and/or 20*b* at a defined point in time, even if there are no problems concerning means 20*a*.

Depending on the conditions, the inventive method may be implemented in hardware or in software. The implementation may be effected on a digital storage medium, in particular a floppy disc or a CD, with electronically readable control signals, which may cooperate such with a programmable computer system that the method is effected. In general, the invention therefore also consists in a computer program product having a program code stored on a machine-readable carrier for performing an inventive method when the computer program product runs on a computer. In other words, the invention may therefore be realized as a computer program with a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for monitoring a data transmitter, from which transmitted data is achievable in response to a request of a receiver, comprising:

an examiner for examining a data traffic at an input of the receiver or at an output of the receiver, the examiner being configured to ascertain whether the data traffic falls below a minimum threshold; and a connection activator for initiating a new connection between the receiver and the data transmitter when the data traffic has fallen below the minimum threshold, wherein the receiver is a process running on a first computer, which is an integral element of a local network, wherein the examiner is configured to run on another second computer, which is also an integral element of the local network, monitor a plurality of further receivers associated with further data transmitters, and in an initiation of a new connection, access the first computer, on which a faulty receiver is running, via the local network; and an internet interface, on the one hand connected to the first computer and the second computer via the local network and on the other hand connectable to the internet.

2. The apparatus of claim 1, wherein the minimum threshold is configured such that an intact data connection between the receiver and the transmitter will not result in the minimum threshold being fallen below, but that a faulty data connection between the data transmitter and the receiver will result in the minimum threshold being fallen below.

3. The apparatus of claim 1, wherein the examiner is configured to use as a minimum threshold a predetermined amount of data per unit of time, a number of packets per unit of time, an error message, a decrease of data per units of time above a threshold, or a presence of an expected signal or a non-presence of an expected signal.

4. The apparatus of claim 1, wherein the data transmitter is a streaming server for audio and/or video data, wherein the receiver is a streaming client including an audio/video player and an activity signal provider, wherein the activity signal provider is configured to provide to the examiner an activity signaling signal, wherein the examiner is configured to evaluate the activity signaling signal in order to examine the data traffic.

5. The apparatus of claim 4, wherein the activity signaling signal indicating the data traffic comprises a predetermined sequence of signal units, wherein the examiner is configured to ascertain that the data traffic falls below the minimum threshold when an activity signaling signal received does not comprise the predetermined sequence.

6. The apparatus of claim 5, wherein the predetermined sequence is subsequent signal pulses or signal packets with a certain temporal distance.

7. The apparatus of claim 1, wherein the examiner is configured to achieve a data-traffic-in-order signal from the receiver when the data traffic exceeds the minimum threshold, and wherein the examiner is configured to ascertain that the minimum threshold is fallen below when no data-traffic-in-order signal is achieved or a data-traffic-faulty signal is achieved, which indicates that the minimum threshold is fallen below.

8. The apparatus of claim 1, wherein the connection activator is configured to deactivate the receiver, to restart the receiver and to prompt the receiver to establish a new connection to the data transmitter.

9. The apparatus of claim 1, wherein the connection from the data transmitter to the receiver is a point-to-point connection, and wherein the connection activator is configured to initiate an establishment of a point-to-point connection from the receiver to the data transmitter.

10. The apparatus of claim 1, wherein the connection activator is configured to activate a connection immediately when the examiner ascertains a data-traffic discontinuation at the input or output without having waited for a predetermined period of time for an alive signal from the receiver.

11. The apparatus of claim 1, wherein the connection activator is configured to repeatedly initiate a connection when the examiner ascertains that a previous connection initiation attempt has failed.

12. The apparatus of claim 11, wherein the connection activator is configured to wait for at least 20 seconds after a connection initiation attempt until a new connection initiation attempt is started.

13. The apparatus of claim 1, wherein the connection activator is configured to activate a connection when a predetermined period of time has expired, even when the examiner has not ascertained the minimum threshold having fallen below.

14. The apparatus of claim 1, wherein the connection activator is configured to automatically initiate a new connection between the receiver and the data transmitter when the data traffic has fallen below the minimum threshold.

15. The apparatus of claim 1, wherein the data transmitter is a streaming server for audio and/or video data, and wherein the connection activator is configured to automatically initiate a new connection between the receiver and the data transmitter when the data traffic has fallen below the minimum threshold.

16. A method of monitoring a data transmitter, from which transmitted data is achievable in response to a request of a receiver, wherein a first computer and a second computer are integral elements of a local network, which on the one hand is connected to an internet interface, which on the other hand is connected to the internet, comprising:

examining a data traffic at an input of the receiver or at an output of the receiver by an examiner, wherein the examiner is configured to ascertain whether the data traffic falls below a minimum threshold; and initiating a new connection between the receiver and the data transmitter when the data traffic has fallen below the minimum threshold, wherein the receiver is a process running on the first computer, which is an integral element of the local network, wherein the examining is effected on the other second computer, which is also an integral element of the local network, wherein, in the examining, a plurality of further receivers associated with further data transmitters are monitored, and wherein, in the initiating, in initiating a new connection, the first computer, on which a faulty receiver is running, is accessed via the local network.

17. A non-transitory machine-readable medium having stored thereon monitoring result data having been produced using a method of monitoring a data transmitter, from which transmitted data is achievable in response to a request of a receiver, wherein a first computer and a second computer are integral elements of a local network, which on the one hand is connected to an internet interface, which on the other hand is connected to the internet, the method comprising:

examining a data traffic at an input of the receiver or at an output of the receiver by an examiner, wherein the examiner is configured to ascertain whether the data traffic falls below a minimum threshold; and initiating a new connection between the receiver and the data transmitter when the data traffic has fallen below the minimum threshold, wherein the receiver is a process running on the first computer, which is an integral element of the local network, wherein the examining is effected on the other second computer, which is also an integral element of the local network, wherein, in the examining, a plurality of further receivers associated with further data transmitters are monitored, and wherein, in the initiating, in initiating a new connection, the first computer, on which a faulty receiver is running, is accessed via the local network.

18. Monitoring result data having been produced using a method of monitoring a data transmitter, from which transmitted data is achievable in response to a request of a receiver, wherein a first computer and a second computer are integral elements of a local network, which on the one hand is connected to an internet interface, which on the other hand is connected to the internet, the method comprising:

examining a data traffic at an input of the receiver or at an output of the receiver by an examiner, wherein the examiner is configured to ascertain whether the data traffic falls below a minimum threshold; and initiating a new connection between the receiver and the data transmitter when the data traffic has fallen below the minimum threshold, wherein the receiver is a process running on the first computer, which is an integral element of the local network, wherein the examining is effected on the other second computer, which is also an integral element of the local network, wherein, in the examining, a plurality of further receivers associated with further data transmitters are monitored, and wherein, in the initiating, in initiating a new connection, the first computer, on which a faulty receiver is running, is accessed via the local network.

19. The method of claim 16, wherein the data transmitter is a streaming server for audio and/or video data, wherein the receiver is a streaming client including an audio/video player and an activity signal provider, wherein the activity signal provider is configured to provide to the examiner an activity signaling signal, wherein the examiner is configured to evaluate the activity signaling signal in order to examine the data traffic.

20. The non-transitory machine-readable medium of claim 17, wherein the data transmitter is a streaming server for audio and/or video data, wherein the receiver is a streaming client including an audio/video player and an activity signal provider, wherein the activity signal provider is configured to provide to the examiner an activity signaling signal, wherein the examiner is configured to evaluate the activity signaling signal in order to examine the data traffic.

21. The method of claim 18, wherein the data transmitter is a streaming server for audio and/or video data, wherein the receiver is a streaming client including an audio/video player and an activity signal provider, wherein the activity signal provider is configured to provide to the examiner an activity signaling signal, wherein the examiner is configured to evaluate the activity signaling signal in order to examine the data traffic.

22. The apparatus of claim 1, wherein a verification is made as to whether, upon initializing a connection between the data transmitter and the receiver, a predetermined period of time has expired or as to whether a certain amount of data has been received, wherein the data traffic at the input of the receiver is examined if the result of the verification is no, and wherein the data traffic at the output of the receiver is examined if the result of the verification is yes.

* * * * *